(12) United States Patent
Mannari et al.

(10) Patent No.: US 10,421,646 B2
(45) Date of Patent: Sep. 24, 2019

(54) LOAD TRANSPORT BY MEANS OF LOAD HANDLING EQUIPMENT

(71) Applicant: Konecranes Global Corporation, Hyvinkää (FI)

(72) Inventors: Ville Mannari, Vantaa (FI); Thomas Gylling, Helsinki (FI); Teemu Paasikivi, Tervakoski (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 186 days.

(21) Appl. No.: 15/322,978

(22) PCT Filed: Jun. 10, 2015

(86) PCT No.: PCT/FI2015/050412
§ 371 (c)(1),
(2) Date: Dec. 29, 2016

(87) PCT Pub. No.: WO2016/001481
PCT Pub. Date: Jan. 7, 2016

(65) Prior Publication Data
US 2018/0170720 A1 Jun. 21, 2018

(30) Foreign Application Priority Data
Jun. 30, 2014 (FI) .................................... 20145637

(51) Int. Cl.
*B66C 13/46* (2006.01)
*B66C 15/06* (2006.01)
(Continued)

(52) U.S. Cl.
CPC .............. *B66C 13/46* (2013.01); *B66C 13/16* (2013.01); *B66C 13/48* (2013.01); *B66C 15/065* (2013.01);
(Continued)

(58) Field of Classification Search
None
See application file for complete search history.

(56) References Cited

U.S. PATENT DOCUMENTS 6,256,553 B1 * 7/2001 Erikkila ................ B66C 13/063
700/213
6,571,172 B1 5/2003 Klement
(Continued)

FOREIGN PATENT DOCUMENTS

CN 1391529 A 1/2003
CN 1884034 A * 12/2006 ............. B66C 13/46
(Continued)

OTHER PUBLICATIONS

Chinese Office Action and Search Report for Chinese Application No. 201580043921.9, dated Nov. 16, 2017, with English translation.
(Continued)

*Primary Examiner* — Thomas G Black
*Assistant Examiner* — Demetra R Smith-Stewart
(74) *Attorney, Agent, or Firm* — Birch, Stewart, Kolasch & Birch, LLP

(57) ABSTRACT

Load handling equipment comprises vertical support structures between which transport means are mounted to be moved along a horizontal support structure between the vertical support structures to move a load relative to the support structures, and a distance-measuring device capable of generating distance measurement data is mounted in at least one of said support structures. The distance-measuring device is arranged to generate distance measurement data on at least two of the following objects relative to their mounting position, the objects comprising: a vehicle positioned beneath or on a side of the load handling equipment, the door of a vehicle, a person, a load, a reflector and transport means for moving a load.

33 Claims, 5 Drawing Sheets

(51) Int. Cl.
- B66C 19/00 (2006.01)
- B66C 13/48 (2006.01)
- B66C 13/16 (2006.01)
- G01S 17/42 (2006.01)
- G01S 7/481 (2006.01)
- G01S 17/88 (2006.01)
- G01S 17/89 (2006.01)
- B65G 63/04 (2006.01)

(52) U.S. Cl.
CPC ............ *B66C 19/007* (2013.01); *G01S 7/481* (2013.01); *G01S 17/42* (2013.01); *G01S 17/88* (2013.01); *G01S 17/89* (2013.01); *B65G 63/045* (2013.01)

(56) References Cited

U.S. PATENT DOCUMENTS

| | | | | |
|---|---|---|---|---|
| 7,344,037 | B1* | 3/2008 | Zakula, Sr. | B66C 13/46 212/270 |
| 2004/0125985 | A1 | 7/2004 | Heidenback et al. | |
| 2005/0192702 | A1 | 9/2005 | Moutsokapas | |
| 2005/0281644 | A1* | 12/2005 | Lussen | B66C 13/085 414/403 |
| 2011/0199234 | A1* | 8/2011 | Butler, III | E04H 6/426 340/932.2 |
| 2011/0240583 | A1* | 10/2011 | Franzen | B66C 13/10 212/318 |
| 2013/0147640 | A1* | 6/2013 | Stocker | B66C 19/002 340/928 |
| 2014/0144862 | A1 | 5/2014 | Rintanen | |
| 2014/0285330 | A1* | 9/2014 | Kouhia | B66C 13/46 340/425.5 |
| 2015/0191333 | A1 | 7/2015 | Kouhia | |
| 2015/0278610 | A1* | 10/2015 | Renner | G06K 9/00798 340/435 |
| 2016/0107865 | A1* | 4/2016 | Mannari | B66C 1/101 294/81.2 |
| 2016/0122161 | A1* | 5/2016 | Mannari | B66C 1/42 700/275 |
| 2016/0137464 | A1* | 5/2016 | Ojapalo | B66C 19/007 212/291 |

FOREIGN PATENT DOCUMENTS

| | | | | |
|---|---|---|---|---|
| CN | 101269751 | A | 9/2008 | |
| CN | 201161875 | Y | 12/2008 | |
| DE | 36 06 363 | A1 | 9/1987 | |
| DE | 4423797 | A1 * | 1/1996 | ........... B66C 13/063 |
| DE | 10202399 | A1 | 8/2003 | |
| DE | 102008019373 | A1 | 1/2009 | |
| DE | 102007055316 | A1 * | 2/2009 | ............ G01B 21/04 |
| DE | 102007046287 | A1 | 4/2009 | |
| EP | 2 328 341 | A1 | 6/2011 | |
| EP | 2574587 | A1 | 4/2013 | |
| FI | 122666 | B | 5/2012 | |
| JP | 59-196487 | A | 11/1984 | |
| JP | 2002-255476 | A | 9/2002 | |
| WO | WO 01/46061 | A1 | 6/2001 | |
| WO | WO 2012/141987 | A1 | 10/2012 | |
| WO | WO 2012/152984 | A1 | 11/2012 | |
| WO | WO 2013/011200 | A1 | 1/2013 | |

OTHER PUBLICATIONS

LASE GmbH, "LASE 3000D Series", online [haettu Jan. 19, 2015], http://web.archive.org/web/20131223055750, http://lase.de/en/sensors/lase-3000d-series.html, julkisesti saatavilla Dec. 23, 2013, total no. pp. 4.

LASE GmbH, "LaseTPC—Truck Positioning Crane: Product module Cews Container Logistics", LASE Industrielle Lasertechnik GmbH, retrieved Sep. 21, 2015, online since Dec. 23, 2013, online: http://lase.de/en/products/port-logistics/truckpositioning-sts.html](http://web.archive.org/web/20131223054121/http://lase.de/en/products/port-logistics/truckpositioning-sts.html), pp. 1-2.

Extended European Search Report for Application No. 15815468.2, dated Jan. 25, 2018.

\* cited by examiner

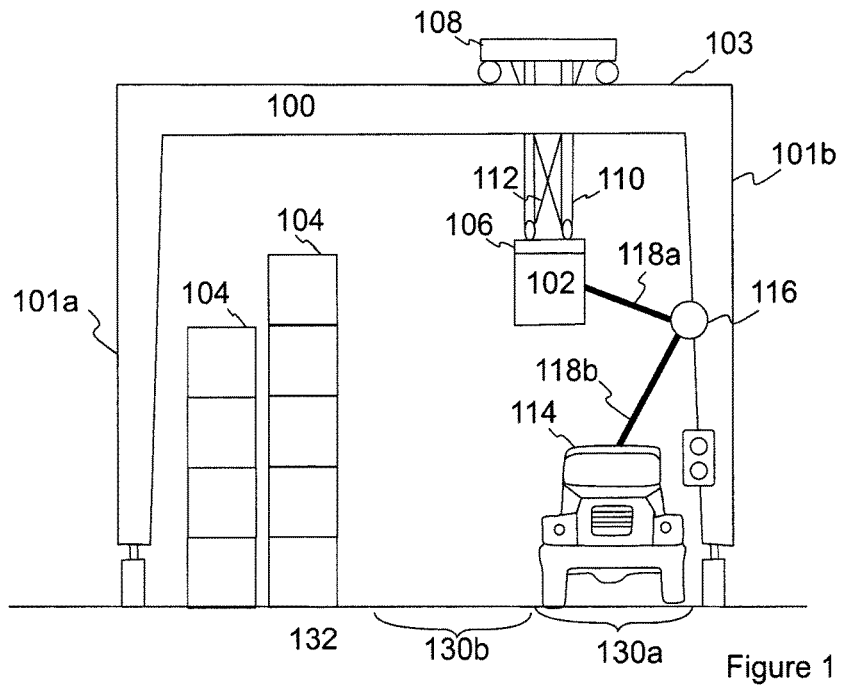
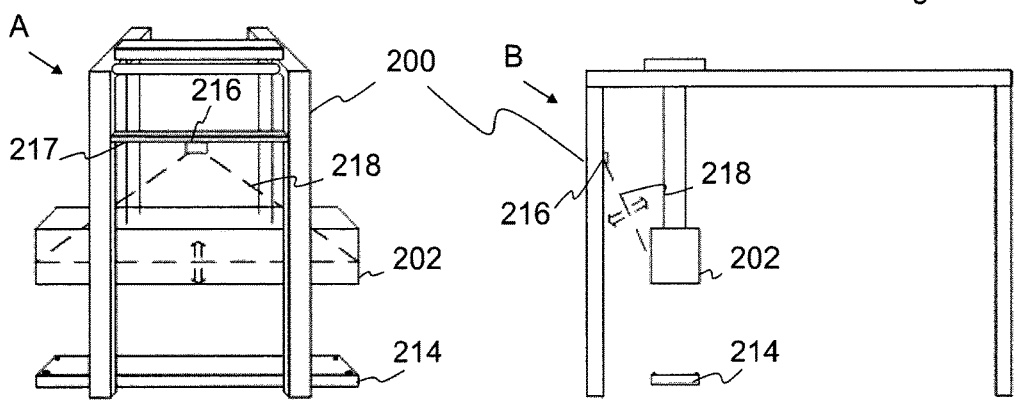
Figure 2
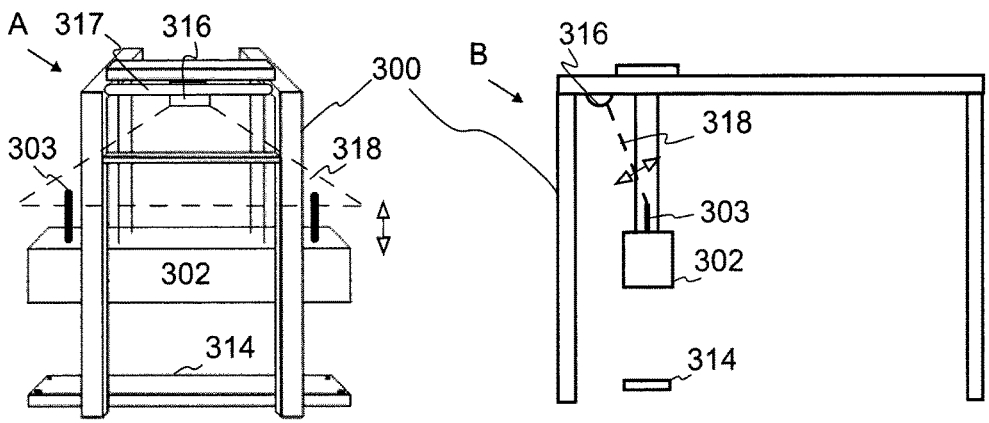
Figure 3

LOAD TRANSPORT BY MEANS OF LOAD HANDLING EQUIPMENT

BACKGROUND OF THE INVENTION

The invention relates to transporting a load by means of load handling equipment and particularly to measurements in load handling equipment in connection with transporting a load.

Today, a vast majority of international sea freight is transported in containers. Containers are boxlike transport units having standard dimensions, either 20, 40 or 45 feet in length. A container is about 2.5 meters in width, and the most typical container heights are about 2.6 meters and 2.9 meters.

Containers are used in land and sea transport between countries and continents. Container dimensions are standardized, whereby it is easier to handle them by various vehicles. In ports, containers are handled by cranes, such as gantry cranes. Within a port area, containers are moved from one place to another or from one vehicle to another, for example from a ship to a port area and from a port area to a vehicle used in internal or external traffic of the port area. Vehicles used in internal and external traffic of a port area include trucks, carriages and railway carriages, for instance. Carriages used in internal traffic of a port area may be highly automated.

Containers are provided with standardized corner castings enabling a container to be hoisted and carried by different container cranes. A container crane is typically provided with a spreader suspended on hoisting ropes or chains, the spreader being adjusted by a telescopic mechanism according to the length of the container to be picked up, for example to a length of 20 or 40 feet. The corners of a spreader are provided with special turnable twist-locks enabling a container to be gripped. The corner castings of the container are provided with standardly shaped holes in which the twist-locks of the spreader are fitted. When the container crane lowers the spreader on top of a container such that all four twist-locks of the spreader are received in the holes of the corner castings, the twist-locks may subsequently be turned by 90 degrees, making the twist-locks lock into the corner castings. The container may then be lifted into the air, suspended from the spreader.

Containers may be stacked on top of one another, typically for instance five containers on top of each other. This enables a large number of containers to be stored within a small area, such as in a container port. The stacking of containers has to be carried out carefully such that the corner castings at the bottom of the container to be stacked are aligned with the corner castings on the roof of the lower container with an accuracy of at least about 5 cm. Otherwise there is a risk of the container stack collapsing.

A typical container crane used for picking up and stacking containers is called a gantry crane, which may move either on rails (RMG, Rail Mounted Gantry Crane) or on rubber tyres (RTG, Rubber Tyred Gantry Crane). When a gantry crane is used, containers are handled between the legs of the gantry crane. Typically, a driveway is left between the legs of the gantry crane to enable containers to be driven along it underneath the gantry crane to be stacked into rows or to be moved to another vehicle.

Laser scanners may be mounted on fixed posts in the port area to facilitate the handling of containers. The position data obtained from the laser scanners is presented in a coordinate system connected to a post. However, the coordinate system used for controlling the crane is typically a coordinate system different from that of the laser scanner, positioned on a post. Thus, utilizing the position data from the laser scanners in handling containers requires matching a plurality of coordinate systems. For the matching, the measurement results obtained from the different coordinate systems must be calibrated relative to each other. Calibrating may, however, cause errors, which deteriorates the accuracy of container handling. If a laser scanner fixedly connected to a geographic coordinate system is utilized by several cranes, all cranes should, in practice, be given similar crane coordinate systems at a given accuracy. In rubber-tyred cranes, for example, tyre pressures that change constitute one possible time-varying error. Errors in the accuracy of container handling may lead to control errors in container handling and cause a danger to personnel and equipment.

Calibrating may have to be redone or at least checked at even intervals, for instance in connection with maintenance operations or installments, and then the crane cannot be used. This results in a decrease in the efficiency of crane operation, which may affect cranes operated in the same area, such as in a port, and the efficiency of operation in the entire port area.

BRIEF DESCRIPTION OF THE INVENTION

The independent claims define load handling equipment, methods and a computer program product according to the invention, which are characterized by what is disclosed in the independent claims. Preferred embodiments of the invention are disclosed in the dependent claims and the detailed description.

Some embodiments allow a load to be moved between the transport means of load handling equipment and the destination in such a way that the number of different coordinate systems in moving the load can be avoided or their number can be reduced.

Using one coordinate system in a crane makes, in practice, the geographic coordinate system irrelevant. Further, when several cranes are used on the same lane, their coordinate systems do not have to be calibrated in the same way.

Using one coordination system also facilitates the work of the equipment supplier in designing and start-up as the whole system can be controlled by one designer from the beginning. After the equipment supply, this advantage can be utilized as such by the person responsible for the maintenance of the system.

The possibility to implement the maintenance in a more straightforward manner than before shows as a higher utilization degree of the port operation.

BRIEF DESCRIPTION OF THE FIGURES

The invention is now described in more detail in connection with preferred embodiments and with reference to the accompanying drawings, in which:

FIG. 1 shows an example of load handling equipment according to an embodiment;

FIGS. 2 and 3 show examples of laser scanners mounted on load handling equipment in accordance with some embodiments;

DETAILED DESCRIPTION OF THE INVENTION

Figure 4A:
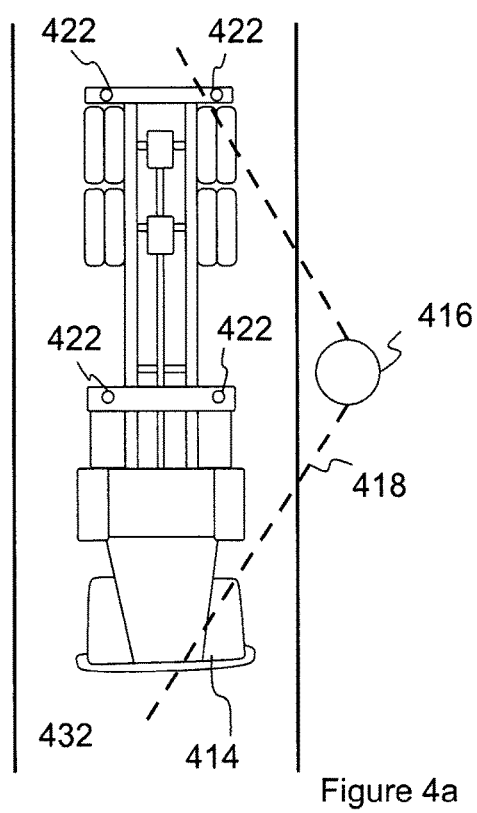
FIGS. 4a and 4b show examples of laser scanners mounted on load handling equipment and directed towards a traffic lane for the load handling equipment in accordance with some embodiments.

FIG. 1 shows an example of load handling equipment according to an embodiment. Load handling equipment 100 comprises vertical support structures 101*a*, 101*b*, between which transport means 106, 108 are mounted to be moved along a horizontal support structure 103 between the vertical support structures to move a load 102, 104 relative to the support structures 101*a*, 101*b*, 103. The load can be moved in directions which deviate from the direction of at least one support structure. In relation to the horizontal and vertical support structures, the load can thus be moved in the horizontal or the vertical direction or in both the horizontal and the vertical direction.

The load handling equipment further comprises a distance-measuring device 116 capable of generating distance measurement data. The distance measurement data may be three-dimensional (3D), two-dimensional (2D) or both 3D and 2D distance measurement data. Distance measurement data is generated in directions in which the distance-measuring device sends a measuring signal. The directions constitute the measurement directions of the distance-measuring device, called a fan. In a fan, the measurement directions open at a spread angle, whereby the distances can be measured in directions positioned within the spread angle. The measurement directions are positioned on the same plane, whereby the distances to the objects positioned in the fan can be aligned. The measurement signal may be light, such as laser light, infrared light or other light wavelength. It is to be noted that light may be visible light or light invisible to human eyes. The measurement signal, on the other hand, may be a radio-frequency signal, for instance an ultra-high frequency (UHF) radio signal.

In an embodiment, the distance-measuring device may be an optical distance-measuring device or a time-of-flight camera (TOF camera), stereo camera, mirror arrangement, computer vision arrangement, pattern recognition arrangement or light curtain arrangement. The optical distance-measuring device may be a laser scanner, for instance. Laser light is emitted by the laser scanner at the scanner's spread angle, which may be for example 180 degrees. The spread angle determines the width of the laser scanner fan. The range of the laser scanner is typically more than 20 m, but the range may also be more than 100 m, depending on the laser scanner model. The optical distance-measuring device may use optical signals other than laser light. The wavelength of the light used may be for instance the wavelength of infrared light.

In the following, embodiments are described with reference to a laser scanner, but instead of a laser scanner, also other distance-measuring devices may be used.

Distance measurement data obtained by a fan is two-dimensional in such a way that the distance measurement data comprises distance data, i.e. a profile, obtained for each measurement direction. By turning the direction of the fan, three-dimensional distance measurement data can be obtained in such a way that there is a separate profile for each fan position.

When distances are measured by a laser scanner, the laser light emitted by the laser scanner is reflected from objects in the direction of emission, whereby the distance to the objects can be determined on the basis of the emitted and reflected beam of light, for instance by determining the propagation time of the laser beam. Laser beams are emitted as a fan, the measurement directions of which are determined by means of degrees. The laser scanner thus gives the distance to an object positioned in the emission direction per each emission direction of a laser beam. Determination of distances may be carried out in the laser scanner or in a separate device connected to the laser scanner and receiving distance measurement data from the laser scanner. The distance measurement data may thus comprise a distance or, for example, time data on the propagation time of a laser beam.

The laser scanner is mounted on at least one of the support structures, such as in a horizontal support structure or in a vertical support structure. The laser scanner is mounted on the support structure in such a way that the laser scanner can generate distance measurement data on at least two of the following objects relative to its mounting position, the objects comprising: a vehicle positioned beneath or on a side of load handling equipment, the door of a vehicle, a person, a load, a reflector and transport means for moving a load.

In this way, it becomes possible to obtain, in the coordinate system of the laser scanner, measurement data generated by the laser scanner on objects positioned beneath the load handling equipment without any coordinate system transformations and/or calibration between the coordinate systems. The data on objects, such as persons and/or the door of a vehicle, can be utilized to improve the safety of load handling.

Placing and accurate positioning of containers with load handling equipment, such as a crane, are usually carried out such that the crane driver controls the process, but the positioning accuracy depends on the skills of the driver. Mounting distance-measuring devices, such as optical distance-measuring devices, for example laser scanners, on load handling equipment and in connection with the control system of the load handling equipment can assist the driver to control the container safely and efficiently.

The vertical support structure of the load handling equipment serves as the leg of the load handling equipment. The horizontal support structure serves as the bridge of the load handling equipment between the vertical support structures. The bridge may be used in load handling above the load handling area, for instance for picking up loads or lowering them into different positions between the legs. The vertical support structures and the horizontal support structures of the load handling equipment may comprise internal support structures which are horizontal, vertical or diagonal. Examples of internal support structures include access bridges, railings and girders.

It is preferable with regard to calibration work that there is a maintenance platform in connection with the distance-measuring device, such as a laser scanner, and a person on the maintenance platform can be with the moving crane in the vicinity of the measuring device. The maintenance platform is thus preferably positioned in connection with the mounting place of the distance-measuring device. The maintenance platform may also be provided with a space for a service PC and a display, and a connection to the bus of the measuring device and the control system of the crane, in which case the person performing the calibration can simultaneously monitor all relevant aspects from the angle of view of the measuring device: the vehicle, movements of the crane, load and measurement data. At the same time, it is possible to perform some control actions for the mounting or settings of the measuring device itself. Thus, reserving a second person for the work and arranging a communication bus can be avoided if it is possible to display the measurement data also outside the crane control room, for example. The access bridge may serve as the maintenance platform. The distance-measuring device may be mounted on a beam or railing, in which case the person on the maintenance platform can reach the distance-measuring device from the maintenance platform.

The distance-measuring device may be positioned in connection with a weather guard. The weather guard may be positioned in a support structure of the load handling equipment, or the weather guard may be fastened to the measuring device. The weather guard protects the device against rain, storm, sunlight and pollen. The weather guard comprises an opening specifically intended for the light beam required by the measuring device in the measurement direction. The maintenance platform may also be protected by a weather guard, which may preferably be a simple rain guard.

In an embodiment, the load handling equipment of FIG. 1 may be a gantry crane, such as a rubber-tyred gantry crane RTG or a rail-mounted gantry crane RMG. The measurement data generated by the laser scanner enables accurate load handling for the load handling equipment, such as gantry crane arranged to pick up a load from the ground, from a load stack or from a vehicle and/or to lower a load to the ground, a load stack or a vehicle.

In the load handling equipment, load handling takes place in a load handling area positioned beneath the horizontal support structure and between the vertical support structures, typically on the ground 132. On the other hand, the load-handling equipment may extend at least partially above water. The load handling area may comprise one or more traffic lanes 130*a*, 130*b* to which a vehicle can be driven. The traffic lane may be under the load-handling equipment, and the load handling equipment may allow a vehicle to be driven through the load handling equipment via the traffic lane. The vehicle may stop on the traffic lane for the duration of the loading, whereby the vehicle is unloaded. In the load handling area, there may further be one or more load stacks, each of which may comprise one or more pieces of load 104. On the other hand, it is to be noted that load stacks are not necessarily needed if the load is moved directly between two vehicles by the load handling equipment. The load transport means may comprise a trolley 108 and a spreader 106, as is usual in gantry cranes. The load is fastened to the transport means by means of the spreader. Loads handled by the spreader are typically containers to which the spreader is fastened by means of lock mechanisms corresponding to corner castings of the container.

The directions of motion of the load may comprise horizontal and/or vertical motion. Vertical motion may be generated by means of a hoisting device which hoists and lowers the spreader. Horizontal motion can be generated by means of rails along which the trolley moves. There may be separate motors for each direction of motion. The load may be connected to the hoisting device by means of ropes 110, 112 to move the load vertically. Stay ropes 112 may be used for the connection between the hoisting device and the load to enable fine transfer of the load by deflecting the spreader 106 from the vertical direction in a desired manner. The vertical direction may be determined to be in the direction of the earth's gravity, in which case the horizontal direction is substantially perpendicular to the direction of the earth's gravity. It is to be noted that in the present embodiments, the directions may also be selected diagonally relative to the earth's gravity, depending on the load handling equipment and its purpose of operation.

The laser scanner fan is preferably directed at the traffic lane, whereby the laser scanner can be used for measuring distances from the traffic lane and from a vehicle 114 possibly arriving or having stopped there. Vehicles can be driven under the load handling equipment on the traffic lane. The laser scanner fan is oriented in the onward direction of the traffic lane in such a way that the laser scanner can be used for measuring distances in the longitudinal direction of the traffic lane and/or vehicle. The laser scanner fan thus opens up in directions targeted at points in the onward direction of the traffic lane on the traffic lane and/or in a vehicle. The fan width is thus parallel to the onward direction of the traffic lane. In the laser scanner or in connection with the laser scanner, there may be a motor, and controlling this motor allows the fan to be turned around the axis parallel to the onward direction of traffic. In this way, the laser scanner fan can be directed at the different traffic lanes 130*a*, 130*b*, the transport means 106 and/or the load 102. In FIG. 1, the different orientations of the fan are illustrated by directions 118*a* and 118*b*. The turning of the fan is preferably implemented by means of a servomotor.

FIGS. 2 and 3 show examples of laser scanners mounted on load handling equipment 200, 300 in accordance with some embodiments. Objects 'A' show a side view of load handling equipment. Objects 'B' show a front view of load handling equipment. The load handling equipment shown in the figures may be the load handling equipment described in the context of FIG. 1. In FIGS. 2 and 3, the laser scanner 216, 316 are mounted on support structures 217, 317 for the load handling equipment. The support structures may comprise one or more vertical and horizontal support structures. The support structures may be actual load-bearing structures or structures that support for instance cabling or other instrumentation. In FIG. 2, the laser scanner 216 is mounted on a beam in a vertical support structure of the load handling equipment. In FIG. 3, the laser scanner 316 is mounted on the beam 317 in the horizontal support structure of the load handling equipment. Preferably, the laser scanner is mounted at a height at which it is above a vehicle, for instance at a height of 4.5 m.

A vertical support structure serves as the leg of the load handling equipment, whereby the load handling is supported against the ground through the leg. A horizontal support structure may serve as a bridge between the vertical support structures, whereby loads can be handled, for example picked up or lowered, in the load handling area of the load handling equipment, for instance on a traffic lane. A vertical support structure and/or horizontal support structure may include internal support structures, such as accessways, where the laser scanner can be fastened.

In FIGS. 2 and 3, the laser scanner is directed at the load handling area. The load handling area includes a traffic lane 214, 314 where vehicles may stop for the duration of the load handling, for instance for the duration of the loading or unloading a vehicle.

In FIG. 2, the laser scanner fan is directed at a load 202 to be handled with the load handling equipment. Preferably, the fan is directed at the side of the load, which allows the load length to be measured. The load may be, for example, lifted from a vehicle on the traffic lane or lowered to a vehicle on the traffic lane. In FIG. 3, the laser scanner fan is directed at reflectors 303 positioned upon a load 302 to be handled. The reflectors may be positioned for instance in transport means, such as a spreader. In this way, the load can be followed with the laser scanner, irrespective of visibility to the side of the load. The reflectors are preferably rod-like and mounted to extend upwards in the vertical direction, which allows them to be observed above the load and from their vertical side.

With reference to the objects of FIG. 1, in one embodiment, the rod-like reflectors may be positioned in the spreader 106 in such a way that their vertical parts overlap or go past the trolley when the spreader is hoisted upwards towards the trolley by a hoisting device, whereby there will be no collision with the trolley even with the spreader being hoisted up. With regard to use of space, this is possible since the space above the load handling equipment is usually free to be used. The solution further allows the largest number of containers possible to be hoisted as the spreader can rise to the highest possible position, for instance at least one container higher than without the described solution with rod-like reflectors, in which they can go past the trolley.

The laser scanner fans 218, 318 may follow the load to be handled when the load is being moved. Thus, the fan is turned around the axis parallel to the onward direction of the traffic lane. Turning of the fan is illustrated in FIGS. 2 and 3 by two-headed arrows.

Figure 4B:
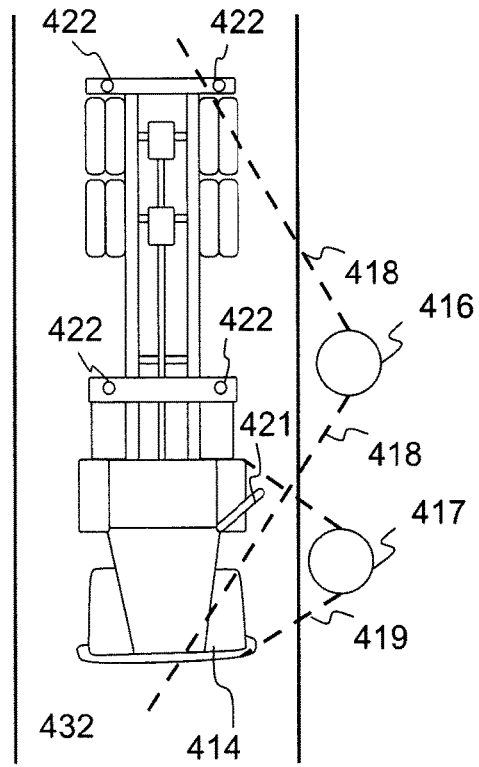

FIGS. 4a and 4b show examples of laser scanners 416, 417 mounted on load handling equipment and directed at a traffic lane 432 for the load handling equipment in accordance with some embodiments. The laser scanner fans open up in the onward direction of the traffic lane. The load handling equipment shown in the figures may be the load handling equipment described in the context of FIG. 1. The laser scanners may be mounted on the load handling equipment in the manners shown in FIGS. 2 and 3. On the traffic lane, there may be a vehicle 414, such as a trailer, truck or another vehicle, by which a load, such as a container, can be transported. The vehicle may comprise fastening points 422 arranged at the fastening points in the load in such a way that the load can be fastened to the vehicle through the fastening points. The fastening points in the vehicle may be pins, in which case the corresponding fastening points in the load are of a suitable shape to receive the pins within them. The containers have standardized fastening points which match the pins of the vehicles.

In FIGS. 4a and 4b, the fan of the laser scanner 416 opens up in such a way that the fan extends at least to the whole length of the vehicle. Preferably, the fan extends at least to the length of the fastening points of the vehicle in the onward direction of the traffic lane, whereby the laser scanner can be used for measuring distances from the fastening points. Preferably, the fan extends at its both ends longer than the vehicle, in which case the position of both ends of the vehicle can be measured from the distance measurement results with the laser scanner. The fan width may exceed the vehicle length by for example 0.5 m. It is to be noted that it is feasible to implement the laser scanner 416 also by means of several laser scanners directed in the same way, in which case the laser scanner fans are directed at the traffic lane in the onward direction, substantially aligned in the onward direction. Hence, each end of the vehicle can be measured by a separate laser scanner, and the fan formed by the fans of all scanners opens up in the onward direction of the traffic lane by a length that is at least the vehicle length and that may exceed the vehicle length, as in the case of one laser scanner. Fastening points may also be measured by several laser scanners in such a way that fastening points at different ends of the vehicle are measured by separate laser scanners.

In FIG. 4b, the load handling equipment comprises a laser scanner 417 directed at a vehicle door 421. The laser scanner fan 419 directed at the door may also be directed in the onward direction of the traffic lane. The width of the laser scanner fan directed at the door may be smaller than the vehicle length, for instance as long as the door or somewhat longer than the door, for instance 0.5 m longer. This allows the vehicle door to be measured by the laser scanner and data to be obtained on the opening of the door when a load is being handled. In the loading area, a particularly important aim is to ensure that there are no people moving in the area. A typical dangerous situation is caused by the driver of the vehicle opening the door and getting off the vehicle. A fan directed at the vehicle door enables the opening of the door to be observed and a dangerous situation to be avoided.

In an embodiment, several laser scanners may be mounted on the load handling equipment, as illustrated by objects 416 and 417 of FIG. 4b. The laser scanners may be mounted in different positions in the load handling equipment, as illustrated by the positions shown in FIGS. 2, 3 and 4b. The positions may be in different support structures of the load handling equipment, such as in vertical or horizontal support structures, or the laser scanners may be positioned in the same support structure. Laser scanners in the same support structure may be positioned in different places in the onward direction of the load handling equipment and/or in different places in the vertical direction of the load handling equipment. Several laser scanners enable simultaneous measuring of a vehicle with laser scanners positioned in different places, whereby a vehicle positioned beneath or on a side of the load handling equipment, vehicle door, person, load and/or transport means can be measured by several distance-measuring devices simultaneously and by distance-measuring devices positioned in different places.

Figure 5:
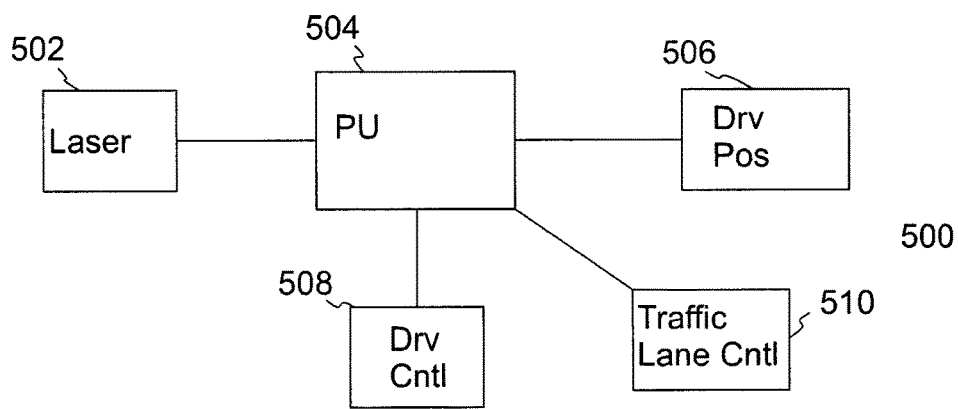
FIG. 5 shows an example of equipment for load handling equipment according to an embodiment.

FIG. 5 shows an example of equipment 500 for load handling equipment according to an embodiment. The equipment can be used for performing operations according to embodiments in load handling equipment. The load handling equipment may be the load handling equipment of FIG. 1. The equipment comprises a processing unit 'PU' 504 with interfaces for connecting the processing unit to a laser scanner 'Laser' 502, to a control system 'Dry Cntl' 508 for the load handling equipment, to a positioning system 'Dry Pos' 506 for the load handling equipment and to a control system 'Traffic Lane Cntl' 510 for a traffic lane. The equipment may also comprise devices and/or systems to which connection is made via the interfaces. The objects connected to the processing unit in the figure may thus illustrate interfaces, or devices and systems connected to the processing unit. Connections between the devices may be by wired or wireless data communications connections, for instance by Ethernet, Profinet or IEEE 802.11-based wireless local area networks. The equipment and/or its parts contain contains memory in which a program code can be stored, and executing this program code allows operations according to some embodiments to be performed.

The processing unit may contain a number of registers, an arithmetic logic unit and a control unit. The control unit is controlled by a sequence of program commands which are sent to the processing unit from the memory. The control unit may contain numerous microinstructions for basic operations. Implementation of the microinstructions may vary, depending on the implementation of the processing unit. The program commands may be coded by means of a programming language, which may a high-level programming language, such as C, Java etc. or a low-level programming language, such as a machine language or an assembler. The memory may be volatile memory or non-volatile memory, for example EEPROM, ROM, PROM, RAM, DRAM, SRAM, firmware, programmable logic etc.

One embodiment relates to a computer program product containing a computer-executable program code to be executed on a computer, which, when executed on the computer, provides operations according to the invention. The computer program may be executed on a computer or a processing unit which is positioned in the load handling equipment. The computer program may be in a source code form, an object code form or an intermediate form, and it may be stored in some kind of a transmission means, which may be any entity or device capable of storing the program. Such transmission means comprise for instance a storing medium, computer memory, read-only memory, electric carrier wave, data communications signal and software distribution package. The memory may be non-volatile or volatile memory, as described above.

The equipment according to the invention and parts thereof may be implemented as one or more integrated circuits, such as an application-specific integrated circuit, ASIC. Other solutions for implementation are also possible, such as a circuit built of separate logic components. A hybrid of these different implementation alternatives is also feasible. An example of circuits made of logic components is the FPGA (Field Programmable Gate Array) circuit.

The laser scanner may be a three-dimensional (3D) laser scanner capable of generating 3D measurement data. Measurement data is generated in measurement directions of the laser scanner fan. A 3D laser scanner may be implemented with a two-dimensional (2D) laser scanner to which a motor is connected in such a way that operating the motor allows the direction of the laser scanner to be turned. Preferably, the laser scanner is connected to the motor to be turned in such a way that when mounted on the load handling equipment, the laser scanner is turnable around the axis parallel to the onward direction of the traffic lane for the load handling equipment. Preferably, the turning direction of the motor is transverse to the plane to which the fan opens, for example to a traffic lane to which the fan spreads out. What is essential, however, is that the turning direction of the fan forms at least a small angle relative to the spreading direction of the fan, which allows the laser scanner to carry out 3D measurements related to monitoring the operations in the volume. Repeated turning may preferably be done by means of the motor, which provides measurement repeated at regular intervals in the volume to be monitored. The turning may continue in the same turning direction, or there may be variation in the turning direction. A varying turning direction gives repeated to-and-fro measurement. This provides measurement that takes place sufficiently often and is directed at a relatively narrow beam or sector, and the measurement result is thus also more accurate than with a sweep that is repeated rarely. A narrow sector is oriented in the direction that is the most interesting at the current moment with regard to the structure and the handling of the load, such as at a vehicle, vehicle door, person, load, transport means, fastening points or reflectors.

The motor control may be implemented for example by a servo connected to the processing unit so as to be controlled by commands received from the processing unit. The control system of the load handling equipment may be a PLC (Programmable Logic Controller) or another control system that can control operations of the load handling equipment. Examples of operations of the load handling equipment comprise hoisting a load, lowering a load, transporting a load in the horizontal direction, transporting a load in the vertical direction and driving the load handling equipment in its operating area, such as in a port.

The positioning system of the load handling equipment generates data on the position of the load handling equipment or one or more of its parts, such as the trolley or spreader. The position data may be in a different coordinate system than the measurement results of the laser scanner. The position data may be obtained for instance from the hoisting device or the trolley of the load handling equipment. The position data obtained from the hoisting device may comprise position data on the load, such as the load height. The load height can be derived from the hoisting rope length that is out of the rope drum.

In a coordinate system, such as in a Cartesian X, Y, Z coordinate system, distance measurements may give values for the x and y coordinates, for instance, and the load height z can be derived in the above manner by means of the rope length. The structural dimensions of the transport means, such as the object 106 of FIG. 1, in the height direction are known in advance, and the height of the containers is usually constant or known from the typical dimensions of containers.

The control system of the traffic lane may comprise traffic control means, such as one or more traffic lights, sensors, communication unit and controller which controls the traffic control means on the basis of the sensor data as well as on the basis of the commands obtained from the communication unit.

In an embodiment, the load handling equipment is upgraded to be able to perform operations according to embodiments. In the upgrading, a distance-measuring device, which is capable of generating distance measurement data, is mounted on the load handling equipment, on at least one of the support structures in such a way that distance measurement data is obtained from at least two of the following objects in relation to their mounting place, the object comprising: a vehicle positioned beneath or on a side of the load handling equipment, the door of a vehicle, a person, a load, a reflector and transport means for moving a load.

The load handling equipment may further be provided with hardware, such as one or more units shown in FIG. 5, for example a processing unit and a laser scanner. The load handling equipment to be upgraded may comprise a control system for the load handling equipment, a positioning system for the load handling equipment, and a control system for the traffic lane. The processing unit may be connected to the data transmission systems of the load handling equipment, for instance by means of the above-described data communications connections. The laser scanner may be mounted on the load handling equipment as shown in FIGS. 2 and 3. The upgraded load handling equipment can implement operations shown in FIG. 6.

Figure 6:
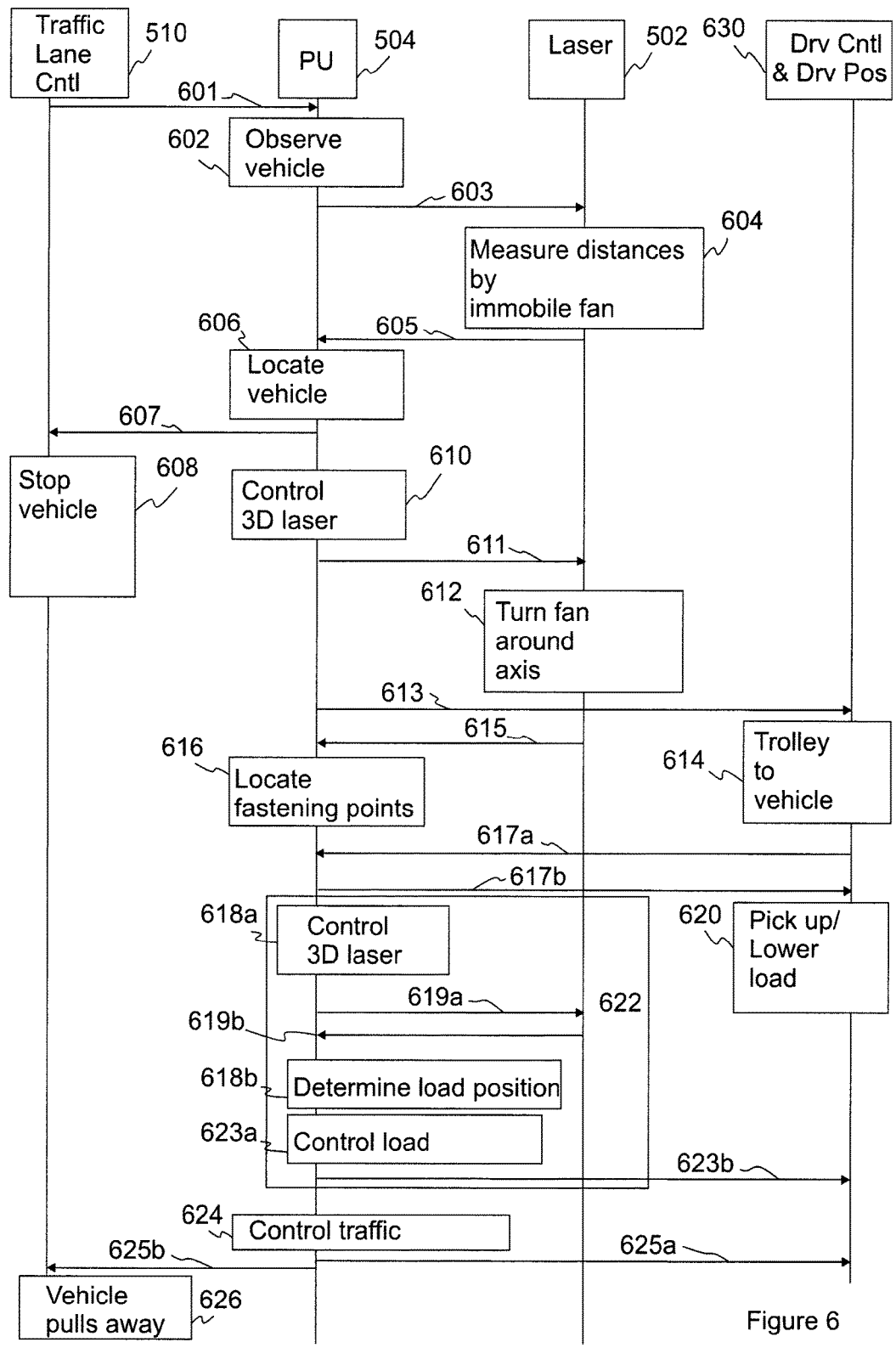
FIG. 6 shows an example of operations in load handling according to an embodiment.

FIG. 6 shows an example of operations in load handling according to an embodiment. The operations are shown with reference to the objects of FIG. 5, implemented in the load handling equipment. The operations of each object illustrate methods which correspond to the operations and which can be carried out by each object in load handling. The presentation of the operations starts from a situation where the traffic lane for the load handling equipment is empty of vehicles. The control system 'Dry Cntl' 508 of the load handling equipment and the positioning system 'Dry Pos' 506 of the load handling equipment are shown as an object 630 in FIG. 6 to illustrate connections of the processing unit to the load handling system. The control unit of the load handling equipment and the positioning system of the load handling equipment may be, depending on the implementation, accessible via the same connection, in which case presenting them in the same object illustrates communication taking place over such a connection. In the following description of FIG. 6, the control system of the load handling equipment thus refers to a logical entity where operations of both the control system of the load transport system and the positioning system of the load transport system are implemented.

A vehicle is observed 602 on a traffic lane. The vehicle can be observed on the basis of data 601 obtained from the control system 510 for the traffic lane. The data may be based on measurements obtained from one or more sensors of the control system of the traffic lane and on the observation which is based on the measurements and sent to the processing unit 504. Sensors may also be laser scanners. Preferably, the data obtained from the control system indicates the traffic lane on which the vehicle has been observed.

The laser scanner is directed 603 at the traffic lane on which the vehicle has been observed. The laser scanner may be directed by sending a command to the laser scanner on the basis of the observation 602 about the vehicle. The command may contain control data on the basis of which the laser scanner can be directed at the traffic lane on which the vehicle has been observed.

After the directing, the laser scanner measures 604 distances. The distances may be measured with an immobile fan, which gives 2D measurement results.

The measurement results are sent 605 to the processing unit where, on the basis of the measurement results, the position of the vehicle is located 606 on the traffic lane. The vehicle observed on the traffic lane may be in motion, whereby several measurement results with the vehicle in different positions on the traffic lane may be received from the laser scanner. When the vehicle is located, the rear and/or front of the vehicle can be observed in the measurement results as a sudden change in the measurement results. A sudden change can be observed as a threshold on both sides of which the values of the distance measurements differ from each other by the amount which corresponds to the shapes of the vehicle. In this way, the position of the front and/or rear of the vehicle can be determined from the change in the measurement results. Further, the vehicle's motion status, i.e. whether it is in motion or has stopped, can be determined from the moving of the position of the front and/or rear of the vehicle in the measurement results.

When the rear and/or front of the vehicle is on the traffic lane in a position where the vehicle can be loaded, the vehicle is stopped 608. The position of the vehicle can be determined from the measurement results from which the proceeding of the front of the vehicle can be followed. Stopping of the vehicle can be achieved by sending a command 607 for stopping the vehicle to the control system of the traffic lane. As a result of the command, the traffic control system can cause the vehicle to stop for instance by controlling traffic lights to show a stop sign, for example red light. When automatic vehicles are used which operate without a driver or by remote monitoring by the operator, the control system of the traffic lane can communicate with the control system of the vehicle to stop the vehicle on the traffic lane in a desired place. In such a case, the stopping can be achieved by, for example, a message from the control system of the traffic lane to the control system of the vehicle, the message indicating a need to stop. When the vehicle has stopped, the loading of the vehicle can be started. In loading the vehicle, the load is transported 614 by the load handling equipment to the vehicle, and the load is positioned 620 at the fastening points of the vehicle, through which points the load is fastened to the vehicle, so as to be transported by the vehicle. When the load has been fastened to the vehicle, the vehicle can pull away 626 to transport the load away from the load handling area. The load can be transported for instance to another unit of load handling equipment or to another vehicle.

Of the stopped vehicle, the fastening points of the load are located 616 for loading the vehicle. Locating the fastening points can be achieved by generating, by means of a laser scanner 3D, measurement results about the vehicle having stopped on the traffic lane. 3D measurement results form a 3D profile of the vehicle. Of the 3D measurement results, the fastening points can be identified by comparing the received measurement results with predetermined data on one or more fastening point profiles. The 3D measurements can be achieved by controlling 610 the laser scanner when the vehicle has stopped. Control data may be sent 611 to the laser scanner, as a result of which 3D measurements are obtained 612 of the vehicle parked on the traffic lane. The 3D measurements may be sent 615 to the processing unit to be used in locating 616 the fastening points. The control data may comprise the direction of the 2D laser scanner fan. The control data sent to the laser scanner may be used to control the servo of the laser scanner, which causes the laser scanner fan to turn around the axis parallel to the onward direction of the traffic lane. The measurement results may comprise 2D measurements measured from different positions of the fan, these measurements being sent 615 to the processing unit to locate the fastening points, whereby the processing unit can form a 3D profile of the vehicle from the 2D measurements.

When the vehicle has stopped on the traffic lane, transporting 614 the load to the vehicle can start. The transport can be carried out by sending 613 to the control system of the load handling equipment data that indicates the traffic lane to which the load must be transported. It is to be noted that locating 616 the fastening points and transporting 614 the load can be carried out at least partly simultaneously to make the load handling more efficient.

The control system of the load handling equipment may send 617a data on the position of the transport means, which is transporting the load, to the processing unit. When the transport means have arrived at the desired location relative to the vehicle on the traffic lane, for example above the vehicle, the laser scanner is controlled 618a to measure distances from the load. The load is then still being transported by the load handling equipment, whereby the load is, for instance, supported above the vehicle. The controlling may be implemented by sending 619a a control command to the laser scanner.

The laser scanner can be controlled 618a on the basis of the position data on the transport means. The position data may be, for instance, height data, in which case the laser scanner is controlled to measure distances from a height at which the load transported by the transport means is positioned. The load may be positioned beneath the load transport means, for example, in which case the laser scanner can be controlled to measure distances 0.5 m beneath the transport means, whereby the distance measurements are obtained from the load, as illustrated in FIGS. 2 and 3.

When the laser scanner is directed 618a at the load, moving of the load towards the fastening points of the vehicle can be started 620 to load the vehicle. Moving of the load can be started by sending 617*b* a control command to the load transport system. When the load is being moved, the laser scanner may follow 622 the load, whereby the laser scanner fan remains directed at the load. The fan must be directed at the load by determining 618*b* the position of the load and by controlling the laser scanner to the position of the load, as disclosed in the objects 618*a* and 619*a*.

When the load is being followed, the processing unit may receive 619*b* measurement data on the load from the laser scanner and compare the measurement data obtained on the load with the position data on the fastening points. On the basis of the position data on the fastening points and the measurement data obtained on the load, the load can be controlled 618*a* towards the fastening points. Since they are done with the same laser scanner, the fastening points and the measurement data on the load are in the same coordinate system and no calibration or coordinate transformation is required.

Measurement results of the load followed are received 619*b* from the laser scanner. The received measurement data may be 2D measurement data on each direction of the fan when the load is being moved towards the fastening points. The received measurement data may be compared with the positions of the fastening points, whereby the load handling equipment can be controlled 623*a* in such a way that the load is transported to the fastening points. A command 623*b* may be sent to the control system of the load transport equipment to control the load to the fastening point.

Steps in objects 622 may be carried out repeatedly when the load is being transported to the fastening point. Preferably, when the distance between the load and the fastening points is determined to be below a given limit value, the control system of the load transport equipment can be controlled to move the load more slowly. The control may be implemented as one or more commands. In addition or instead of speed, load rotation in relation to the fastening points can be controlled. Rotation refers to rotation seen from above. The control can attend to the placement of the load in such a way that the places of all fastening points, typically four, match within the limits of determined accuracy, and the load can be lowered directly to its place.

When the loading has been finished, traffic 624 on the traffic lane can be controlled. The traffic control may comprise controlling the control system of the vehicle in such a way that the vehicle can be made exit the traffic lane. The loading can be determined to be finished when the load has arrived at the fastening points of the vehicle. The arrival of the load at the fastening points of the vehicle can be determined 618*b* on the basis of the position of the load. The arrival of the load at the fastening points of the vehicle can also, if required, be ensured on the basis of the data obtained from the hoisting device on the tightness of the hoisting ropes. After the placement the ropes loosen, and data on this is transmitted via the size of the load (lifting capacity). Data from the hoisting device can be obtained from a control system 630 for the load handling equipment.

When the load has arrived at the fastening points of the vehicle, the load transport means can be prepared 624 for the pull-away of the vehicle. The preparation may comprise sending 625*a* a command to the control system of the load transport equipment, as a result of which command the load transport means are detached from the load and moved away from the load and the vehicle, whereby the vehicle can pull away without any obstacles.

Data may be sent 625*b* to the control system of the traffic lane, and it indicates that the vehicle may pull away. The control system of the traffic lane may cause 626 the vehicle to pull away by controlling the traffic lights to show green or by sending a pull-away command to the vehicle when the vehicle is an automatic one.

Figure 7:
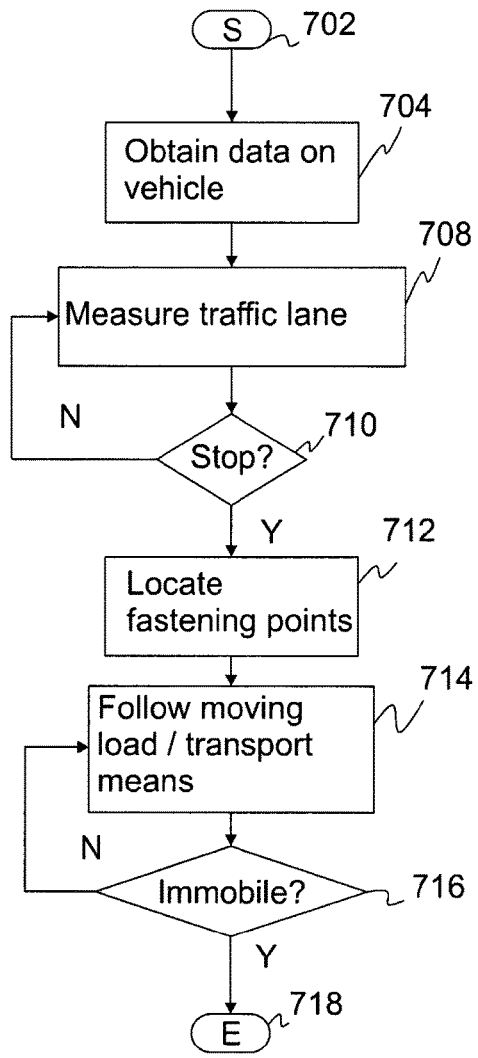
FIG. 7 shows an example of controlling a laser scanner in load handling equipment in accordance with an embodiment.

FIG. 7 shows an example of controlling a laser scanner in load handling equipment in accordance with an embodiment. The laser scanner may be mounted on a support structure of the load handling equipment in FIGS. 4*a* and 4*b* in accordance with the objects 416, in which case the laser scanner fan extends at least over the length of the load-fastening points of the vehicle in the onward direction of the traffic lane. The laser scanner may be connected to the processing unit in accordance with FIG. 5, in which case the processing unit may receive the measurements of the laser scanner and control the laser scanner. Control of the laser scanner can be started 702 when the laser scanner has been mounted on the load handling equipment and it is on, so that it can be controlled.

Data is received 704 on a vehicle approaching the traffic lane for the load handling equipment. The data may be received in the manner shown in step 602 in FIG. 6.

The traffic lane is measured 708 with the laser scanner. The laser scanner may be directed at the traffic lane where the vehicle has been observed, as described in the object 603. The directing may be done by controlling a servo which turns the laser scanner fan around the axis parallel to the onward direction of the traffic lane. When the laser scanner has been directed, the laser scanner measures the vehicle with an immobile fan to locate the vehicle, as described in the objects 604 and 605.

If 710 the vehicle has stopped, the laser scanner is used to locate 712 the load-fastening points in the vehicle. The fastening points may be located on the basis of 3D measurement data obtained by the laser scanner, as described in the objects 612, 615 and 616.

If 710 the vehicle has not stopped, measuring 708 of the traffic lane with the laser scanner is continued.

After the fastening points have been located, the load being transported by the load transport equipment is followed 714 by the laser scanner. The load may be followed in the manner described in the object 622.

If 716 the load has been transported to its proper place, the method for controlling the laser scanner ends 718. If the load is not in place, following 714 of the load may be continued. The load is in place when it is at the fastening points of the vehicle. This may be determined in the manner disclosed in the object 618*a*.

It is to be noted that when the traffic lane is measured 708 by the laser scanner while data is being received 704 on the vehicle approaching the traffic lane, the fan is preferably larger than in the following steps of the method where fastening points are located 712 and the load is followed 714. Thus, at the beginning of the method, the vehicle can be located although the vehicle may still be in motion and positioned on the edges of the traffic lane. When the vehicle has stopped on the traffic lane where it is loaded or unloaded, the fan may be focused. The spread angle of a large fan is greater than that of a focused fan. The size of the spread angle of the fan can be adjusted to be smaller or larger by sending the laser scanner a command which indicates a new spread angle or a change in the current spread angle of the laser scanner. Controlling may be carried out in connection with the control of the laser scanner shown in FIG. 6. The spread angle of the laser scanner may be controlled by a servo connected to the laser scanner.

Figure 8:
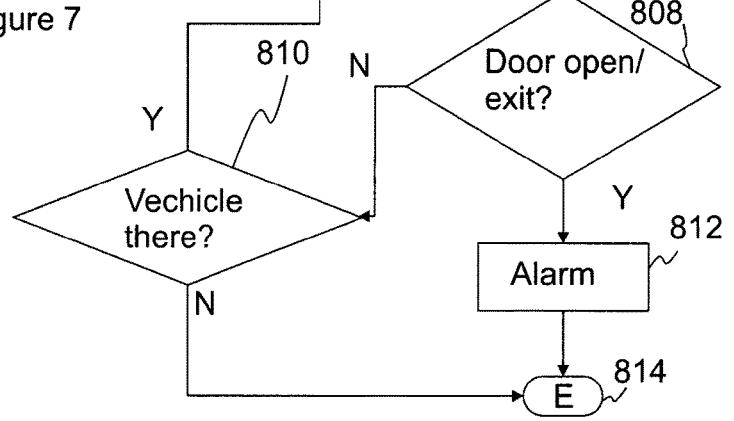
FIG. 8 shows using a laser scanner for access control of a vehicle in load handling equipment in accordance with an embodiment.

FIG. 8 shows using a laser scanner for access control for a vehicle in load handling equipment in accordance with an embodiment. Here, access control for a vehicle refers to the access control of persons out of and/or into a vehicle. The load handling equipment may be provided with several laser scanners in accordance with FIG. 4b. At least one of the laser scanners is controlled in such a way that it follows the load, as described in the context of FIG. 8. At least one of the laser scanners is directed at the door of the vehicle. The laser scanner directed at the door remains directed at the door while the vehicle is on the traffic lane. In this way, access through the vehicle door can be monitored while another laser scanner is used for performing distance measurements from the load and the fastening points. Both laser scanners are turnable around the axis parallel to the onward direction of the traffic lane, whereby the laser scanners can be directed at the vehicle having stopped on the traffic lane or at the vehicle door. Directing the laser scanners is preferably done before the transport of the load is started, as disclosed in the object 603.

Access control is depicted by means of a control method for the laser scanner directed at the vehicle door, which method can be started 802 when a vehicle has stopped on the traffic lane and a laser scanner has been directed at the vehicle door. Stopping of the vehicle can be determined by locating the vehicle on the traffic lane, as disclosed in the object 606.

Distance measurements are obtained 804 from the vehicle door. Distance measurements are obtained at least from the period when the vehicle is being loaded or unloaded. During this period, the vehicle is immobile on the traffic lane.

On the basis of the measurement results, the state of the vehicle door and/or whether there is a person getting out of the vehicle is determined 806. The state of the vehicle door may be open or closed. The determination may comprise comparing the measurement results with reference measurement results. The reference measurement results that may comprise measurement results from one or more doors and/or persons may be compared with the measurement results of the laser scanner and to determine that the door is opened and/or a person is getting out of the vehicle. The measurement results may be provided for several different vehicles in connection with the introduction of access control. Reference measurement results may also be loaded to hardware that executes access control by means of a network connection or USB (Universal Serial Bus).

If 808 the result of the comparison indicates that the door is open and/or a person is getting out of the vehicle, an alarm can be given 812. The alarm may be given by sending an alarm message to the control system of the load handling system. As a result of the alarm message, the control system of the load handling system may give an alarm and/or stop the load handling on the basis of the received data. The alarm may be given locally in the immediate surroundings of the load handling equipment, and/or the alarm may be transmitted to the control room, where the operation of several units of load handling equipment is monitored. The alarm may be given by one or more sounds and/or lights. When the alarm has been given, the access control has detected a dangerous situation, and the access control may be terminated 814. The access control may be continued after the danger is over by carrying out access control starting from step 802.

If 808 the result of the comparison indicates that the vehicle door is closed or no one is getting out of the vehicle, access control for the vehicle door may be continued 804. Continuing may be conditional to the vehicle still being on the traffic lane. Monitoring the vehicle door is continued 804 if 810 the vehicle is immobile on the traffic lane. If 810 the vehicle is pulling away or has pulled away, the access control may be stopped 814. The position of the vehicle on the traffic lane can be determined on the basis of the data obtained from the control system of the traffic lane in the manner disclosed in the object 602.

FIGS. 9a, 9b, 9c, 9d and 9e show examples of controlling a fan of a laser scanner 916 on a traffic lane 930 for load handling equipment. The traffic lane is shown in the onward direction of the traffic lane. The load handling equipment comprises at least one laser scanner 916 mounted on support structures of the load handling equipment, for example in the manner shown in FIGS. 2 and 3. FIGS. 9a to 9e show directions 918a, 918b, 918c, 918d and 918e of the laser scanner when a vehicle 914 is being loaded. Before the vehicle arrives at the traffic lane, the fan may be directed away from the traffic lane. The direction may be at another traffic lane, for instance. When a vehicle is observed on the traffic lane, the fan 918a may be directed at the traffic lane and the vehicle, as disclosed in the object 918b. The directing takes place as disclosed in the object 708. In an embodiment, each traffic lane has a separate laser scanner.

Figure 9A:
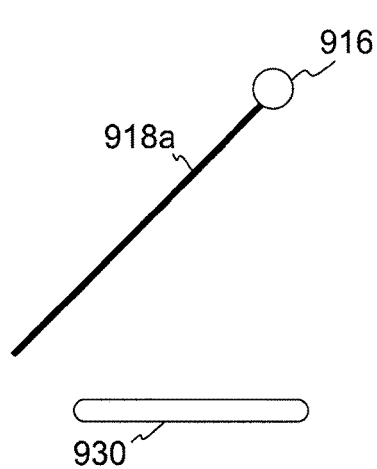
FIGS. 9*a*, 9*b*, 9*c*, 9*d* and 9*e* show examples of controlling a fan of a laser scanner on a traffic lane for load handling equipment.
Figure 9B:
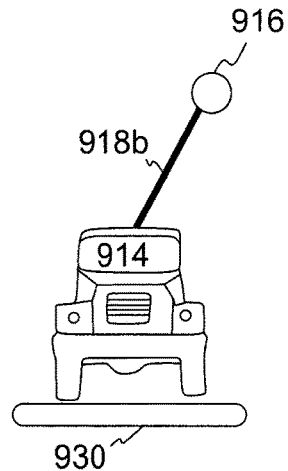
Figure 9C:
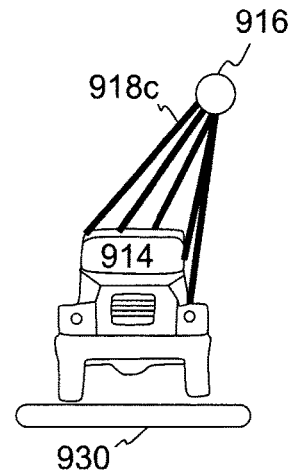

FIG. 9c shows the fan directions 918c when the fastening points for a load in the vehicle are being located. The fan direction may be turned around the axis parallel to the onward direction of the traffic lane. Measurement results formed in different directions of the fan can be used to form a 3D profile of the vehicle. From the 3D profile formed, the fastening points can be identified by comparing the 3D profile formed with reference profiles of the fastening points, as disclosed in the object 712.

Figure 9D:
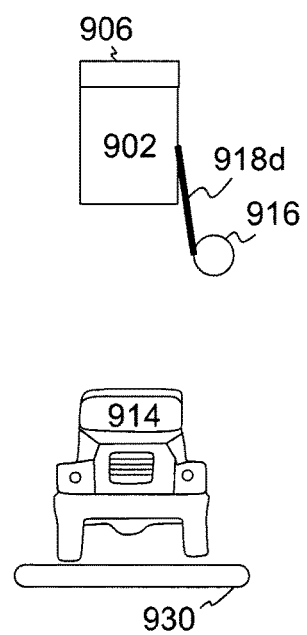

FIG. 9d shows directing of the fan 918d at the load which is being moved as it is fastened to transport means 906 for the load. The vehicle is positioned below the load, whereby the vehicle is loaded by lowering the load onto the vehicle. During the lowering, the fan follows the load, whereby it is directed at the load for the whole period of lowering. The load may be followed as shown in the object 714.

Figure 9E:
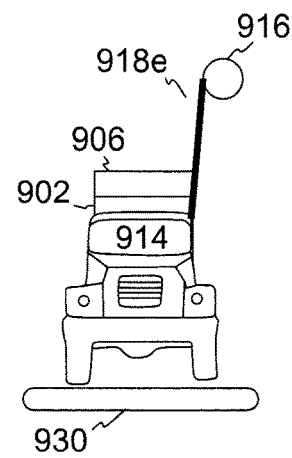

FIG. 9e shows a situation where the load has been lowered onto the vehicle. Lowering of the load onto the vehicle can be determined on the basis of the measurement results of the fan 918e directed at the load and the fastening points of the located loads, as described in the context of FIG. 716.

As illustrated by FIGS. 9a to 9e, the distance measurements performed by the laser scanner may be 3D measurements when fastening points are located, as illustrated in FIG. 9c. In other cases, 2D measurements can be used in load handling.

The present invention is applicable to any load handling equipment, hoisting device, crane, container crane, gantry crane, straddle carrier, overhead crane, quay crane or to any combination of different devices provided with gripping means for being fastened to a load.

The devices according to the embodiments described may be implemented as one or more logical or physical units. The implementation manner for the units may depend on the technical platform on which a device is implemented. The technical platform, such as one or more processing units, software platforms and protocols may be determined separately for each implementation, or they may be determined according to the implementation environment.

Although the above embodiments have been described with reference to loading a vehicle, the above embodiments are also applicable to unloading a vehicle. In such a case, instead of the fastening points of the vehicle, the fastening points of the load are located, and instead of the load, the transport means are followed which are moved to fetch the load from the vehicle.

Devices, such as load handling equipment, hoisting devices, cranes, container cranes, gantry cranes, straddle carriers, overhead cranes, quay cranes, which implement the operationality of the device according to the embodiments described above comprise not only prior art means but also means for receiving distance-measurement data from at least two of the following objects in relation to their mounting place, the objects comprising: a vehicle positioned beneath or on a side of the load handling equipment, the door of a vehicle, a person, a load, a reflector and transport means for moving a load.

More specifically, they may comprise means for implementing the operationality of the device described in the embodiment described above, and they may comprise separate means for each separate operation, or the means may be arranged to perform two or more operations. Known devices comprise processors and memory that may be utilized for the one or more functionalities described in the embodiments described above.

The operations performed by the laser scanner may be implemented by an optical distance-measuring device which measures distances on the basis of emission and reflection of optical signals, such as light, received in response to an optical signal emitted. Optical signals may be emitted, as described above, to a laser scanner and, below, to a modification of embodiments. An optical distance-measuring device may thus use another optical signal, such as light, instead of laser light. The wavelength of light to be used can be selected to be suitable for each particular implementation.

In one modification of the above-described embodiments, a laser scanner, such as the object 416 of FIG. 4*a*, is implemented for instance with two laser scanners mounted with fans at 90 degrees relative to one another. Both laser scanners produce 2D profiles which are processed by way of software. From the 2D profiles of laser scanners, a 3D profile can be obtained which is substantially the same as the 3D profile produced on the basis of distance measurements of one turnable laser scanner.

Other alternatives to perform the operation according to the embodiments are provided by TOF cameras (Timo of Flight cameras), stereo cameras, mirrors, computer vision, pattern recognition programme, light curtain or other arrangements measuring various surfaces by means of an emitted beam and a received beam and enabling generation of position data on the object measured by means of distance measurement. Motors and/or servos may be connected to a TOF camera, stereo camera, mirrors, computer vision, pattern recognition, light curtain or another arrangement such that the distance measurements are obtained from a desired object, which may be a vehicle positioned beneath or on a side of the load handling equipment, vehicle door, person, load, reflector or transport means for moving a load. On the other hand, for instance a TOF camera allows distance measurements without any motors or servos. An area of a TOF camera image may be selected in relation to the hoisting height of the spreader and the position of the trolley. A TOF camera or a corresponding system may possibly also allow the opening of a door to be monitored at the same time. A TOF camera generates 3D distance measurement data on the shooting area of the camera.

It is apparent to a person skilled in the art that the devices shown in the embodiments described above may also contain parts other than those described above which are irrelevant to the invention and which, for the sake of clarity of the disclosure, have thus been omitted.

It is obvious to a person skilled in the art that as technology advances, the basic idea of the invention may be implemented in many different ways. In one modification of the above-described embodiments, a laser scanner, such as the object 416 of FIG. 4*a*, is implemented for instance with two laser scanners mounted with fans at 90 degrees relative to one another. Both laser scanners produce 2D profiles which are processed by way of software. From the 2D profiles of laser scanners, a 3D profile can be obtained which is substantially the same as the 3D profile produced on the basis of distance measurements of one turnable laser scanner.

Other alternatives to perform substantially the same operation are provided by TOF cameras (Timo of Flight cameras), stereo cameras, mirrors, computer vision, pattern recognition programme, light curtain or other arrangements measuring various surfaces by means of an emitted beam and a received beam and enabling generation of position data on the object measured by means of distance measurement.

The invention and its embodiments are thus not restricted to the above-described examples but may vary within the scope of the claims.

The invention claimed is:

1. A load handling equipment comprising:
   vertical support structures;
   a horizontal support structure;
   transport means mounted to be moved along the horizontal support structure between the vertical support structures to move a load relative to the vertical and horizontal support structures; and
   a distance-measuring device configured to generate distance measurement data and mounted in at least one of said vertical and horizontal support structures,
   wherein the distance-measuring device is arranged to generate distance measurement data on at least two of the following objects relative to mounting places thereof, the objects comprising: a vehicle positioned beneath or on a side of the load handling equipment, a door of a vehicle, a person, a load, a reflector and the transport means for moving the load, and
   wherein the distance-measuring device is configured in a manner such that a spread angle formed by measurement directions of the distance-measuring device is adjustable, and the distance-measuring device is configured to have a first spread angle when a traffic lane is measured by the distance-measuring device while data is being received on a vehicle approaching the traffic lane, and to have a second spread angle when the vehicle has stopped on the traffic lane where the vehicle is loaded or unloaded, the first spread angle being greater than the second spread angle.

2. The load handling equipment according to claim 1, wherein beneath the horizontal support structure of the load handling equipment and between the vertical support structures, there is a traffic lane, and the measurement directions of the distance-measuring device of the load handling equipment are directed in an onward direction of the traffic lane.

3. The load handling equipment according to claim 1, wherein the distance-measuring device is mounted in connection with a weather guard, in connection with a maintenance platform, on an access bridge, on a railing or on a beam.

4. The load handling equipment according to claim 1, wherein the distance-measuring device is connected to a motor in such a way that the measurement directions of the distance-measuring device are turnable around the axis parallel to the onward direction of the traffic.

5. The load handling equipment according to claim 1, comprising a distance-measuring device connected to a servo by the control of which the measurement directions of the distance-measuring device are turnable around the axis parallel to the onward direction of the traffic.

6. The load handling equipment according to claim 1, wherein the distance-measuring device is directed at a traffic lane beneath the horizontal support structure and between the vertical support structures of the load handling equipment, and the load handling equipment comprises a control unit connected to the distance-measuring device, whereby the control unit and the distance-measuring device are connected to each other at the same time:
to locate a vehicle on the traffic lane; and
to locate the fastening points in the vehicle or in the load transported by the vehicle; and
to follow the load or load transport means when they are being moved towards the vehicle.

7. The load handling equipment according to claim 1, wherein the measurement directions of the distance-measuring device are wider when a vehicle arriving at the traffic lane is located than when the fastening points are located or when the load or load transport means are followed.

8. The load handling equipment according to claim 1, wherein a vehicle is located from a 2D profile formed by the distance-measuring device when the distance-measuring device is directed at a traffic lane.

9. The load handling equipment according to claim 1, wherein fastening points are located from a 3D profile formed by the distance-measuring device when the distance-measuring device is directed at a vehicle having stopped on a traffic lane.

10. The load handling equipment according to claim 1, wherein the load is followed by the distance-measuring device on the basis of position data on the transport means.

11. The load handling equipment according to claim 1, wherein the measurement directions of the distance-measuring device are first directed at a traffic lane, and when fastening points have been located, the measurement directions are directed at the transport means or at the load fastened to the transport means.

12. The load handling equipment according to claim 1, wherein the distance of the load or the transport means from fastening points are determined, and if the distance is below a threshold value, the speed of the transport means is reduced.

13. The load handling equipment according to claim 1, comprising several distance-measuring devices of which at least one is directed at the door of a vehicle having stopped on a traffic lane during load handling, whereby, on the basis of distance measurements by the distance-measuring device, access control for persons getting out of and/or into the vehicle is carried out.

14. The load handling equipment according to claim 1, wherein the load handling equipment comprises one or more distance-measuring devices capable of generating three-dimensional measurement data.

15. The load handling equipment according to claim 1, wherein the distance-measuring device measures distances from at least two fastening points of a vehicle, the load, the transport means and reflectors.

16. The load handling equipment according to claim 1, comprising a trolley and a spreader which is connected to the trolley to be moved in the vertical direction, whereby the spreader is provided with rod-like reflectors extending upwards.

17. The load handling equipment according to claim 1, wherein the load handling equipment is a gantry crane and wherein containers are hoisted and lowered by spreaders connected to a trolley with which the containers are moved between the legs of the crane.

18. The load handling equipment according to claim 1, wherein the distance-measuring device comprises at least one of the following: an optical distance-measuring device, a time-of-flight camera, stereo camera, mirror arrangement, computer vision arrangement, pattern recognition arrangement or light curtain arrangement.

19. A method for load handling by a load handling equipment, the load handling equipment comprising vertical support structures; a horizontal support structure; transport means mounted to be moved along the horizontal support structure between the vertical support structures to move a load relative to the vertical and horizontal support structures; and a distance-measuring device configured to generate distance measurement data and mounted in at least one of said vertical and horizontal support structures, wherein the distance-measuring device is arranged to generate distance-measurement data, the method comprising:
receiving distance measurement data on at least two of the following objects relative to mounting positions thereof, the objects comprising: a vehicle positioned beneath or on a side of the load handling equipment, a door of a vehicle, a person, a load, a reflector and the transport means for moving the load,
wherein the distance-measuring device is configured in a manner such that a spread angle formed by measurement directions of the distance-measuring device is adjustable, and the distance-measuring device is configured to have a first spread angle when a traffic lane is measured by the distance-measuring device while data is being received on a vehicle approaching the traffic lane, and to have a second spread angle when the vehicle has stopped on the traffic lane where the vehicle is loaded or unloaded, the first spread angle being greater than the second spread angle.

20. The method according to claim 19, wherein beneath the horizontal support structure and between the vertical support structures of the load handling equipment, there is a traffic lane, and the measurement directions of the distance-measuring device of the load handling equipment are directed in an onward direction of the traffic lane.

21. The method according to claim 19, wherein the distance-measuring device is connected to a motor, whereby the method comprises turning the measurement directions of the distance-measuring device around the axis parallel to the onward direction of the traffic.

22. The method according to claim 19, wherein the distance-measuring device is connected to a servo, the method comprising:
controlling the servo to turn measurement directions of the distance-measuring device around the axis parallel to the onward direction of the traffic.

23. The method according to claim 19, the method comprising by the distance-measuring device:
directing the distance-measuring device at a traffic lane beneath the horizontal support structure and between the vertical support structures of the load-handling equipment;
locating a vehicle on the traffic lane; and
locating the fastening points in the vehicle or in the load transported by the vehicle; and
following the load or load transport means when they are being moved towards the vehicle.

24. The method according to claim 19, comprising controlling the measurement directions of the distance-measuring device in such a way that when a vehicle arriving at a traffic lane is located, the measurement directions are wider than when fastening points are located or when the load or transport means are followed.

25. The method according to claim 19, comprising locating a vehicle from a 2D profile formed by the distance-measuring device when the distance-measuring device is directed at a traffic lane.

26. The method according to claim 19, comprising locating fastening points from a 3D profile formed by the distance-measuring device when the distance-measuring device is directed at a vehicle having stopped on a traffic lane.

27. The method according to claim 19, comprising following the load by the distance-measuring device on the basis of position data on the transport means.

28. The method according to claim 19, comprising directing the measurement directions of the distance-measuring device first at a traffic lane, and when fastening points have been located, directing the measurement directions at the transport means or at the load fastened to the transport means.

29. The method according to claim 19, comprising determining the distance of the load or the transport means from fastening points, and if the distance is below a threshold value, reducing the speed of the transport means.

30. The method according to claim 19, wherein the load handling equipment comprises several distance-measuring devices of which at least one is directed at the door of a vehicle having stopped on a traffic lane during load handling, whereby, on the basis of distance measurements by the distance-measuring device, access control of persons getting out of and/or into the vehicle is carried out.

31. The method according to claim 19, wherein the load handling equipment comprises one or more distance-measuring devices from which three-dimensional measurement data is received.

32. The method according to claim 19, comprising receiving, from the distance-measuring device, distance measurements from at least two fastening points of a vehicle, the load, the transport means and reflectors.

33. A non-transitory computer program product comprising a computer-executable program code which, when executed on a computer, causes operations according to claim 19 to be performed.

* * * * *